United States Patent
Iwamura et al.

(10) Patent No.: US 11,709,584 B2
(45) Date of Patent: Jul. 25, 2023

(54) USER INTERFACE DEVELOPMENT ASSISTANCE DEVICE, USER INTERFACE DEVELOPMENT ASSISTANCE METHOD, AND NON-TRANSITORY COMPUTER-READABLE RECORDING MEDIUM

(71) Applicant: OMRON Corporation, Kyoto (JP)

(72) Inventors: Shintaro Iwamura, Otsu (JP); Daisuke Takahashi, Moriyama (JP)

(73) Assignee: OMRON Corporation, Kyoto (JP)

(*) Notice: Subject to any disclaimer, the term of this patent is extended or adjusted under 35 U.S.C. 154(b) by 12 days.

(21) Appl. No.: 16/639,559

(22) PCT Filed: Jul. 30, 2018

(86) PCT No.: PCT/JP2018/028378
§ 371 (c)(1),
(2) Date: Feb. 14, 2020

(87) PCT Pub. No.: WO2019/039197
PCT Pub. Date: Feb. 28, 2019

(65) Prior Publication Data
US 2021/0132755 A1    May 6, 2021

(30) Foreign Application Priority Data

Aug. 25, 2017   (JP) ................. 2017-161708

(51) Int. Cl.
*G06F 3/0484* (2022.01)
*G06F 3/0482* (2013.01)
(Continued)

(52) U.S. Cl.
CPC .......... *G06F 3/0484* (2013.01); *G06F 3/0481* (2013.01); *G06F 3/0482* (2013.01);
(Continued)

(58) Field of Classification Search
CPC ........ G06F 3/0484; G06F 3/0482; G06F 8/38; G06F 9/453; G06F 3/0481; G06F 9/451
(Continued)

(56) References Cited

U.S. PATENT DOCUMENTS 5,339,392 A * 8/1994 Risberg ................. H04L 69/08
715/255
5,845,299 A * 12/1998 Arora .................... G06F 40/137
715/209

(Continued)

FOREIGN PATENT DOCUMENTS

| CN | 106422329 | 2/2017 |
|---|---|---|
| CN | 106648338 | 5/2017 |

(Continued)

OTHER PUBLICATIONS

JP2012014560A—Machine Translation, Hiroshi et al., "Graphic Editing Program, Graphic Editing method and graphic editing apparatus", Espacenet, pp. 1-19 (Year: 2012).*

(Continued)

*Primary Examiner* — Dino Kujundzic
*Assistant Examiner* — Jianmei F Duckworth
(74) *Attorney, Agent, or Firm* — JCIPRNET

(57) ABSTRACT

A UI development assistance device (10) comprising a UI editing unit (11), an operation input unit (12), and a display unit (14). The UI editing unit (11) executes a UI editing process and generates a UI editing screen (140). The display unit (14) displays the UI editing screen (140). The operation input unit (12) receives operations pertaining to UI editing. When a plurality of overlapping (UI) objects are present on the UI editing screen (140), the UI editing unit (11) displays a list of the plurality of overlapping (UI) objects on the (UI) editing screen (140) in accordance with a prescribed operation by means of the operation input unit (12).

8 Claims, 14 Drawing Sheets

(51) Int. Cl.
*G06F 8/38* (2018.01)
*G06F 9/451* (2018.01)
*G06F 3/0481* (2022.01)

(52) U.S. Cl.
CPC ............ *G06F 8/38* (2013.01); *G06F 9/451* (2018.02); *G06F 9/453* (2018.02)

(58) Field of Classification Search
USPC ........................................................ 715/762
See application file for complete search history.

(56) References Cited

U.S. PATENT DOCUMENTS

| | | | |
|---|---|---|---|
| 6,542,172 B1 | 4/2003 | Yamamoto | |
| 8,773,468 B1* | 7/2014 | Ballagh | G09G 5/14 345/634 |
| 2002/0140746 A1* | 10/2002 | Gargi | G06F 3/0483 715/853 |
| 2004/0004632 A1* | 1/2004 | Knight | G06F 3/04812 715/711 |
| 2007/0174790 A1* | 7/2007 | Jing | G06F 16/54 715/838 |
| 2008/0034047 A1* | 2/2008 | Rosenberg | G06Q 10/109 709/206 |
| 2009/0138810 A1 | 5/2009 | Howard et al. | |
| 2010/0007623 A1* | 1/2010 | Kaneko | G06F 3/04883 345/173 |
| 2012/0096396 A1* | 4/2012 | Ording | G06F 3/04883 715/799 |
| 2013/0047115 A1* | 2/2013 | Migos | G06F 3/0484 715/776 |
| 2013/0174179 A1* | 7/2013 | Park | G06F 9/4843 718/107 |
| 2014/0207771 A1* | 7/2014 | Merg | G06Q 10/20 707/731 |
| 2016/0110076 A1* | 4/2016 | Reeves | G06F 3/04845 715/761 |
| 2018/0129363 A1* | 5/2018 | Axelsson | G06F 3/04817 |
| 2019/0278459 A1* | 9/2019 | da Costa | G06F 3/04815 |

FOREIGN PATENT DOCUMENTS

| | | | |
|---|---|---|---|
| CN | 107045447 | | 8/2017 |
| JP | H11259278 | | 9/1999 |
| JP | 2012014560 | | 1/2012 |
| JP | 2012014560 A | * | 1/2012 |
| JP | 2015153073 | | 8/2015 |
| TW | 201416954 | | 5/2014 |

OTHER PUBLICATIONS

"International Search Report (Form PCT/ISA/210) of PCT/JP2018/028378," dated Oct. 23, 2018, with English translation thereof, pp. 1-4.

"Written Opinion of the International Searching Authority (Form PCT/ISA/237) of PCT/JP2018/028378," dated Oct. 23, 2018, with English translation thereof, pp. 1-8.

Naoki Nozawa and Masanori Ebisu, "FileMaker Pro 16 Super Referenc," Sotechsha Co., Ltd., first edition, Jul. 2017, pp. 1-11.

"Office Action of Japan Counterpart Application", dated Jun. 2, 2020, with English translation thereof, p. 1-p. 9.

"Search Report of Europe Counterpart Application", dated Mar. 25, 2021, pp. 1-11.

"Office Action of China Counterpart Application", dated Mar. 30, 2023, with English translation thereof, pp. 1-13.

* cited by examiner

USER INTERFACE DEVELOPMENT ASSISTANCE DEVICE, USER INTERFACE DEVELOPMENT ASSISTANCE METHOD, AND NON-TRANSITORY COMPUTER-READABLE RECORDING MEDIUM

CROSS-REFERENCE TO RELATED APPLICATION

This application is a 371 application of the International PCT application serial no. PCT/JP2018/028378, filed on Jul. 30, 2018, which claims the priority benefits of Japan Patent Application No. 2017-161708, filed on Aug. 25, 2017. The entirety of each of the above-mentioned patent applications is hereby incorporated by reference herein and made a part of this specification.

BACKGROUND

Technical Field

The invention relates to a technique of assisting in programmer's development of a user interface.

Description of Related Art

Currently, a display having a user interface (UI) is generally used in a factory automation (FA) system. The display has a function of displaying the state of each device in the FA system, and a function of receiving an operation input such as setting data and command data for each device.

Therefore, in the display image, necessary objects among the UI objects such as a button for receiving an operation input, a lamp for indicating the state of the device, and a display frame for displaying a measured value, etc., as shown in Patent Document 1, for example, are displayed.

These UI objects are set with properties such as arrangement position, size, and color on the UI screen.

In the development of such a UI, the programmer arranges the UI objects on the UI editing screen and sets properties for the UI objects.

RELATED ART

Patent Document

[Patent Document 1] Japanese Laid-Open No. 2015-153073

SUMMARY

Problems to be Solved

Depending on the UI editing screen, a plurality of UI objects may overlap. The overlapping of a plurality of UI objects occurs in the following case, for example.

When creating UIs for a plurality of production lines that have the same process, it is easier to create the UIs for a plurality of production lines at the same time than to create a UI for each production line. In addition, for production lines of the same process, similar UIs are easier to use. Therefore, the programmer puts the UI objects for each production line over each other and edits them on the UI editing screen.

Then, in this case, one of the overlapping UI objects may be hidden by another UI object on the UI editing screen. For this reason, the programmer cannot visually recognize other UI objects.

Furthermore, the UI object of each production line may have different properties. For example, the UI objects of different production lines may have different colors and the control set thereto may be different.

Here, when there are UI objects hidden, as described above, an editing error may occur. For example, the programmer may forget to edit the properties of the hidden UI object, resulting in that a desired UI cannot be created.

Therefore, the invention is to provide a UI development assistance technique that prevents editing errors for a plurality of overlapping UI objects.

Means for Solving the Problems

The user interface development assistance device includes a user interface editing unit, a display unit, and an operation input unit. The user interface editing unit executes an editing process of a user interface and displays a generated editing screen on a display. The operation input unit receives an operation for editing of the user interface. When a plurality of user interface objects overlap on the editing screen, the user interface editing unit displays a list of the plurality of user interface objects that overlap in the editing screen according to an operation for list display from the operation input unit.

With this configuration, when the plurality of user interface objects overlap on the screen and only the topmost user interface object can be visually recognized, the plurality of user interface objects that overlap are displayed side by side.

Also, in the user interface development assistance device, the operation input unit may receive an operation of a pointer indicating a position in the editing screen, and the user interface editing unit may display the list if the position of the pointer overlaps a topmost user interface object.

With such a configuration, the plurality of user interface objects that overlap are displayed side by side simply by overlapping the pointer on the user interface object.

Further, in the user interface development assistance device, when an operation input of selecting one of the plurality of user interface objects in the list is received from the operation input unit, the user interface editing unit may display the selected user interface object as the topmost user interface object to be edited.

With such a configuration, the user interface object that is not on the topmost layer is displayed on the topmost layer and can be edited.

In addition, in the user interface development assistance device, when an operation input of unifying positions or shapes for the plurality of user interface objects in the list is received from the operation input unit, the user interface editing unit may unify the positions or the shapes of the plurality of user interface objects in the list.

With such a configuration, the positions or shapes of the plurality of user interface objects that overlap can be unified by a simple operation.

Further, in the user interface development assistance device, when an operation input of unifying attributes for the plurality of user interface objects in the list is received from the operation input unit, the user interface editing unit may unify the attributes of the plurality of user interface objects in the list.

With such a configuration, the attributes of the plurality of user interface objects that overlap can be unified by a simple operation.

In addition, in the user interface development assistance device, when an operation input of changing a positional relationship between the plurality of user interface objects in the list is received from the operation input unit, the user interface editing unit may change the positional relationship between the plurality of user interface objects in the list and set the topmost user interface object of the plurality of user interface objects that overlap on the editing screen according to the change.

With such a configuration, the order of the plurality of user interface objects that overlap is changed easily, and the change in the order is also reflected on the topmost user interface object.

Effects

According to the invention, editing errors can be prevented even when a plurality of UI objects overlap.

DESCRIPTION OF THE EMBODIMENTS

Figure 1:
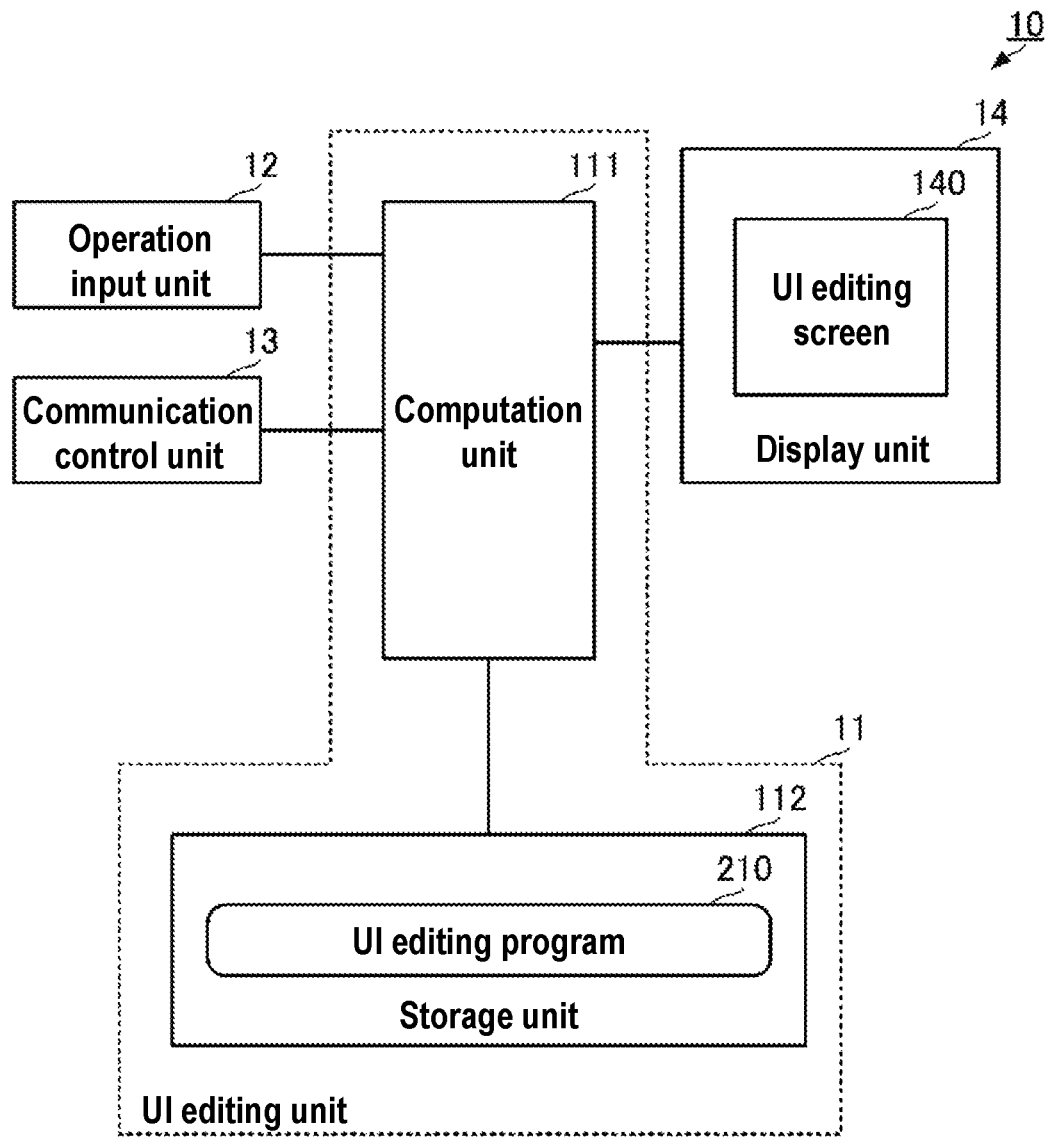
FIG. 1 is a functional block diagram of a user interface development assistance device according to an embodiment of the invention.

A user interface development assistance technique according to an embodiment of the invention will be described with reference to the drawings. FIG. 1 is a functional block diagram of a user interface development assistance device according to an embodiment of the invention.

As shown in FIG. 1, the UI (user interface) development assistance device 10 includes a UI (user interface) editing unit 11, an operation input unit 12, a communication control unit 13, and a display unit 14. The UI development assistance device 10 is realized by an information processing device such as a personal computer.

The UI editing unit 11 includes a computation unit 111 and a storage unit 112. The computation unit 111 is realized by a CPU or the like, and the storage unit 112 is realized by a storage medium such as a hard disk, a semiconductor memory or the like. The storage unit 112 stores a UI (user interface) editing program 210. The UI editing program 210 is a program that generates and edits a UI screen by creating a UI (user interface) object, performing arrangement in the screen, and setting attributes according to an operation input from the operation input unit 12. The computation unit 111 reads and executes the UI editing program 210 to generate and edit the UI screen. The UI editing unit 11 enables the display unit 14 to display the UI screen being edited, that is, the UI editing screen 140.

The operation input unit 12 includes, for example, a mouse and a keyboard and receives an operation input from an operator of the UI development assistance device 10, such as a programmer. The operation input unit 12 outputs the received operation content to the computation unit 111.

The communication control unit 13 executes communication control with a control device such as a PLC (programmable logic controller).

The display unit 14 is, for example, a liquid crystal display and displays the UI editing screen 140 edited by the UI editing unit 11.

Figure 2:
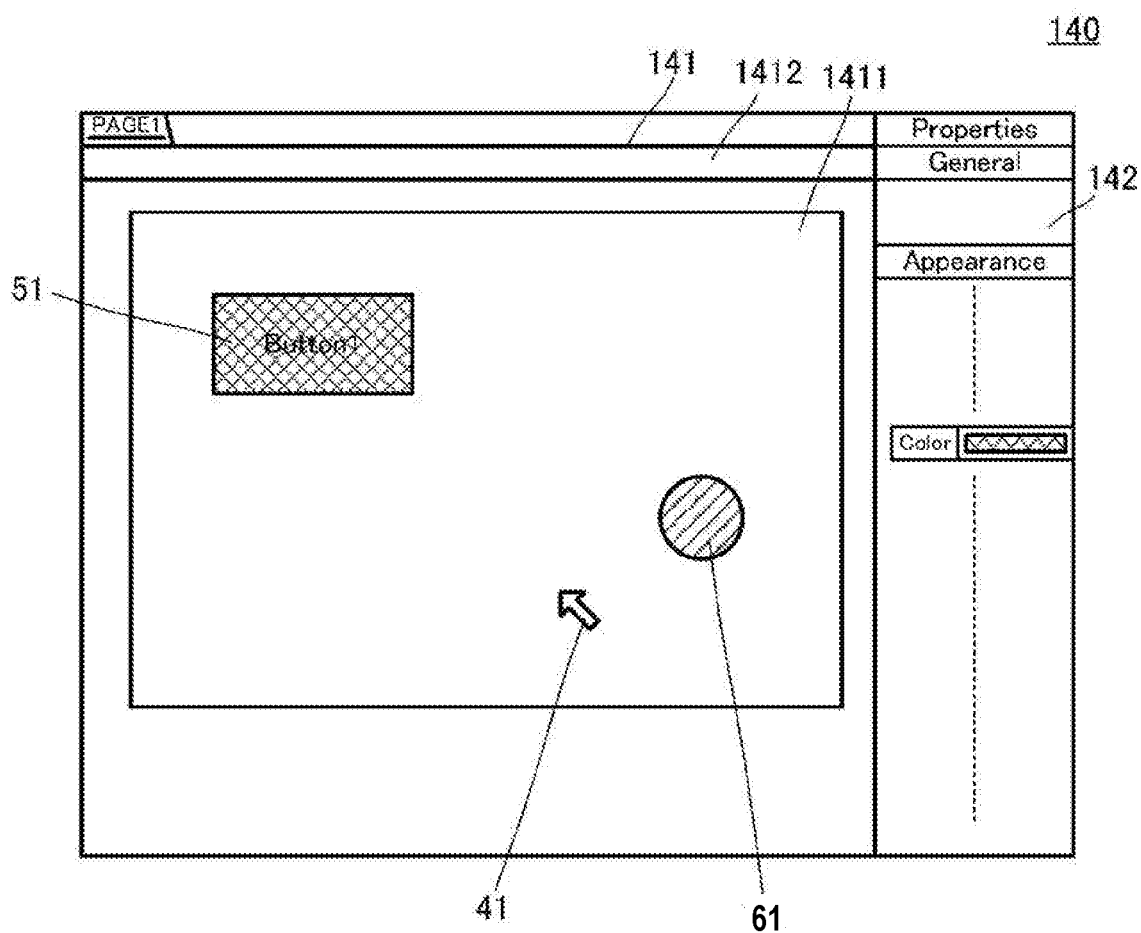
FIG. 2 is a diagram showing an example of a UI editing screen according to an embodiment of the invention.

FIG. 2 is a diagram showing an example of the UI editing screen. As shown in FIG. 2, the UI editing screen 140 includes a main window 141, an attribute display window 142, and a pointer 41. The main window 141 and the attribute display window 142 are displayed side by side.

The main window 141 has a screen editing area 1411 and a toolbar 1412. The screen editing area 1411 occupies substantially the entire area of the center of the main window 141.

The created UI objects such as UI objects 51 and 61 are arranged in the screen editing area 1411. The UI object is a figure representing a button, a lamp or the like, a frame for displaying a numerical value or the like.

The toolbar 1412 is arranged with tools to be used for creating these UI objects. For example, the programmer selects a tool on the toolbar 1412 and executes a prescribed process on the screen editing area 1411 to realize creation of the UI object.

Various attributes of the UI object selected at that time in the screen editing area 1411 are arranged in the attribute display window 142. The attributes include the name and type of the UI object, variables set to the UI object, shape, color, size, arrangement position or the like of the figure.

(List Display)

Figure 3:
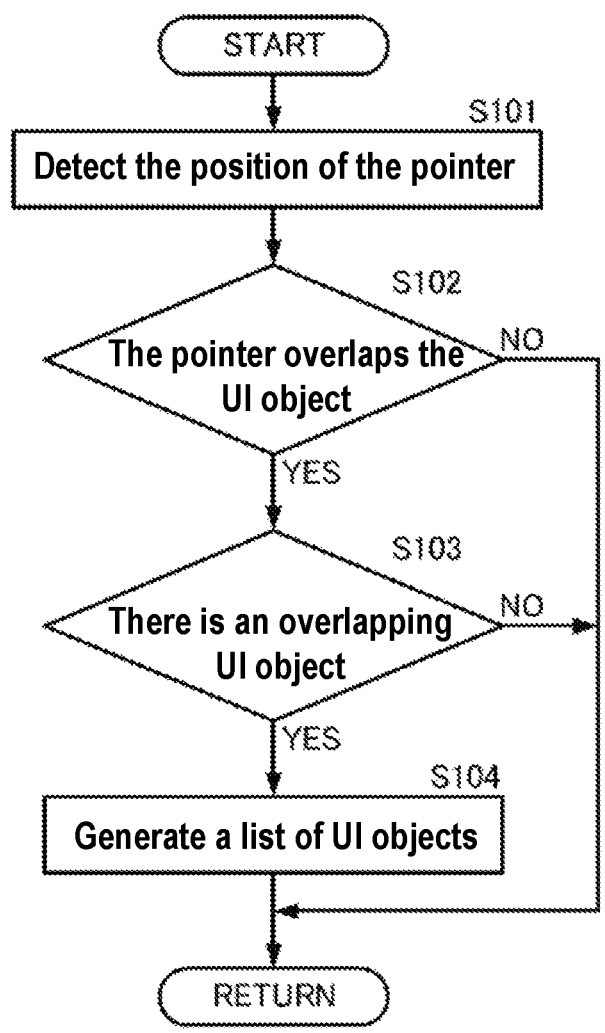
FIG. 3 is a flowchart showing a method of generating a list of a plurality of UI objects.
Figure 4:
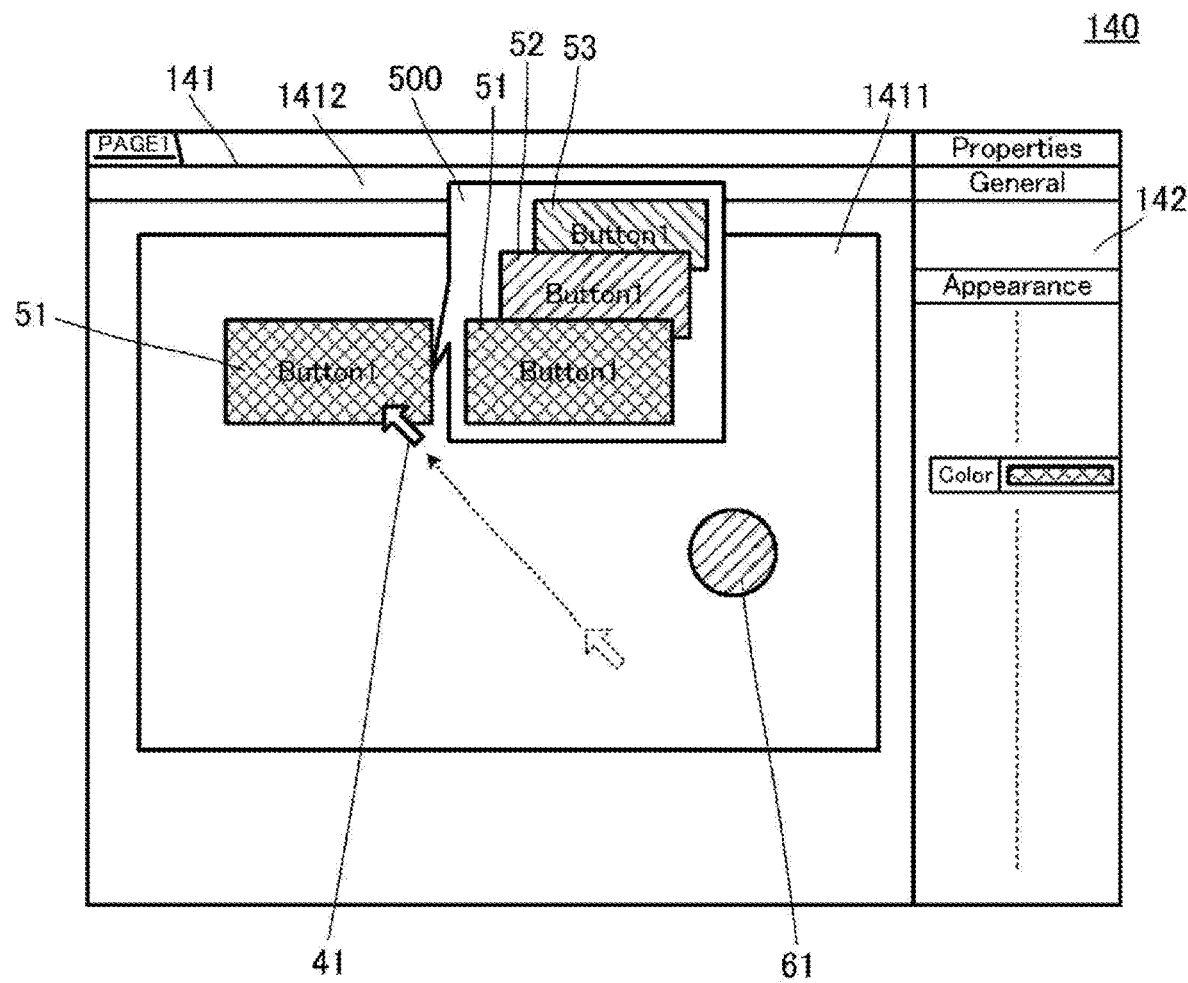
FIG. 4 is a diagram showing a first display mode of a list of a plurality of UI objects.
Figure 5:
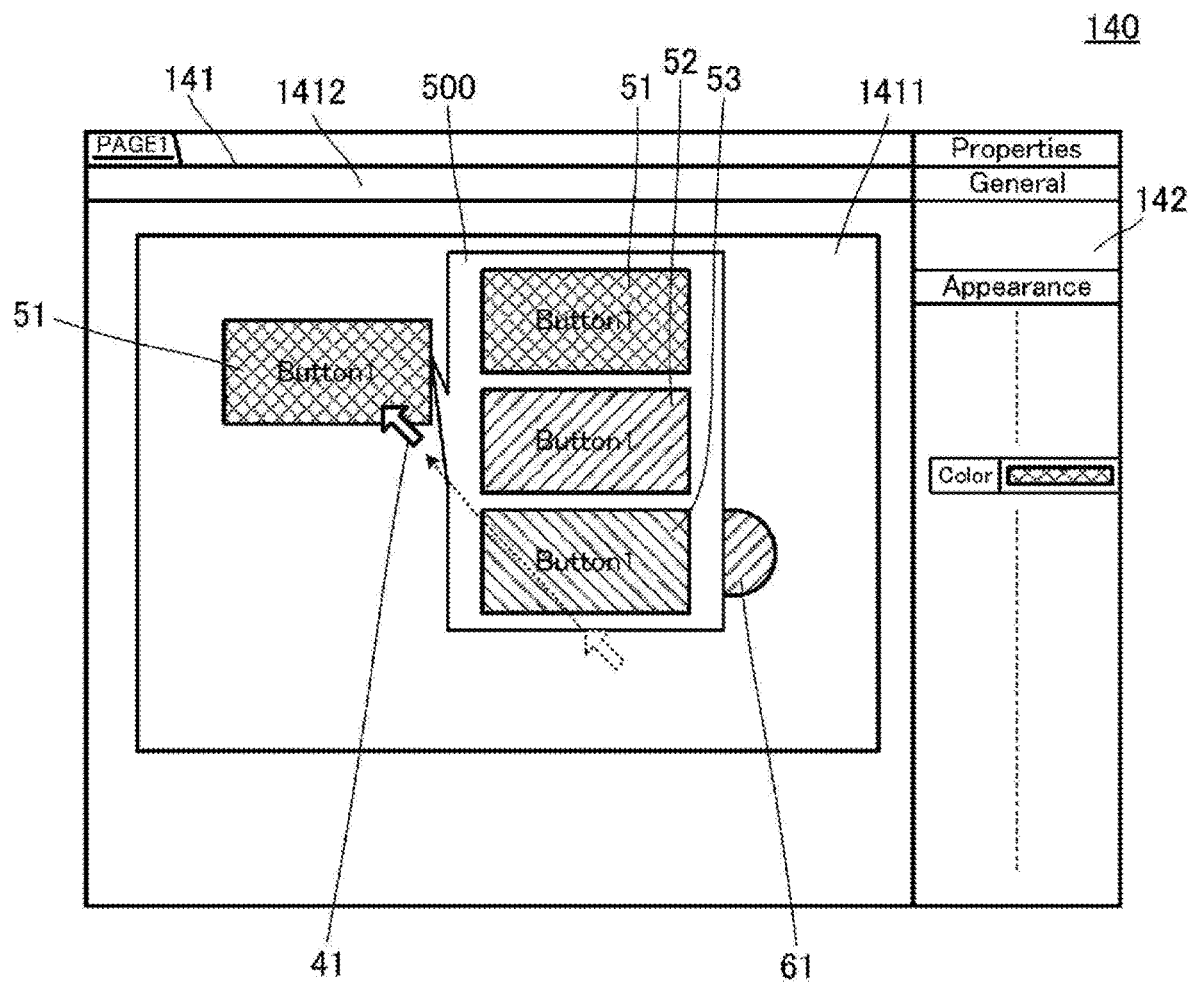
FIG. 5 is a diagram showing a second display mode of a list of a plurality of UI objects.

FIG. 3 is a flowchart showing a method of generating a list of a plurality of UI objects. FIG. 4 is a diagram showing a first display mode of a list of a plurality of UI objects. FIG. 5 is a diagram showing a second display mode of a list of a plurality of UI objects.

When a plurality of UI objects overlap in the screen editing area 1411 of the UI editing screen 140, the UI editing unit 11 generates a list of a plurality of UI objects as shown in FIG. 4 or FIG. 5 and arranges it in the UI editing screen 140 by executing the processing shown in FIG. 3.

First, the UI editing unit 11 detects the position (coordinates) of the pointer 41 on the UI editing screen 140 (S101).

The UI editing unit 11 detects whether the position of the pointer 41 on the screen editing area 1411 overlaps the UI object (S102). This is because the area of the UI object in the screen editing area 1411 is stored in two-dimensional coordinates, for example. If the position coordinates of the pointer 41 are in the area of the UI object defined by the two-dimensional coordinates, the UI editing unit 11 determines that the pointer and the UI object overlap. The operation of overlapping the pointer 41 on the UI object corresponds to the operation for list display.

If the pointer 41 does not overlap the UI object (S102: NO), the UI editing unit 11 stands by until the next operation input is made to the pointer 41.

As shown in FIG. 4, if the pointer 41 overlaps the UI object (S102: YES), the UI editing unit 11 detects whether another UI object overlaps the UI object (S103). For example, the UI editing unit 11 detects an overlap with the existing UI object when editing and registering a new UI object. Then, the UI editing unit 11 stores a plurality of overlapping UI objects together with their positional relationship in the Z direction. Thereby, in the subsequent editing, the UI editing unit 11 can detect the overlapping of the UI objects and the positional relationship in the Z direction, that is, the positional relationship between the UI objects sequentially arranged from the topmost UI object to the back side.

If a plurality of UI objects overlap the UI object on which the pointer 41 overlaps in the screen editing area 1411 (S103: YES), the UI editing unit 11 generates a list 500 of the overlapping UI objects (S104) and arranges it in the UI editing screen 140 as shown in FIG. 4.

The list 500 includes the UI object 51 on which the pointer 41 overlaps, and the UI object 52 and the UI object 53 which overlap the UI object 51. In the list 500, the UI object 51, the UI object 52, and the UI object 53 are arranged in order from the top layer side as set by the UI editing program 210.

With such processing, simply by overlapping the pointer on the UI object in the UI editing screen 140, the programmer can visually recognize other UI objects hidden by the UI object on the UI editing screen 140 easily. Thereby, the programmer can prevent editing errors such as forgetting to edit the hidden UI objects. Further, the programmer can grasp the arrangement order of a plurality of UI objects from the top layer.

At this time, as shown in FIG. 4, the UI editing unit 11 partially overlaps the UI object 52 with the UI object 51 on the top layer side and arranges the UI object 52 so that a part of the UI object 52 cannot be visually recognized. Similarly, the UI editing unit 11 partially overlaps the UI object 53 with the UI object 52 on the top layer side and arranges the UI object 53 so that a part of the UI object 53 cannot be visually recognized. Thereby, the programmer can more easily understand and visually recognize the order of the UI objects 51, 52, and 53 from the top layer.

Furthermore, as shown in FIG. 4, the UI editing unit 11 sets to display the UI objects to be gradually smaller from the top layer side toward the back side. Thereby, the programmer can more intuitively understand the order of the UI objects 51, 52, and 53 from the top layer.

In addition, the UI editing unit 11 arranges the list 500 close to the UI object 51 on which the pointer 41 is overlapped. Thereby, it is easy for the programmer to visually recognize which UI object in the UI editing screen 140 hides other UI objects.

The UI editing unit 11 can also set a list as shown in FIG. 5. FIG. 5 is a diagram showing a second display mode of a list of a plurality of UI objects.

In the display mode shown in FIG. 5, the UI editing unit 11 generates a list 500 in which the UI objects 51, 52, and 53 are sequentially arranged in the vertical direction of the UI editing screen 140, and arranges the list 500 in the UI editing screen 140. As in FIG. 4, with this setting, the programmer can also visually recognize other UI objects hidden by the UI object on the UI editing screen 140 easily. Further, the programmer can grasp the arrangement order of a plurality of UI objects from the top layer. In addition, in the display mode of FIG. 5, the arrangement from the top layer side can be displayed to be easily understandable without changing the sizes of a plurality of overlapping UI objects.

The above illustrates a mode of detecting the pointer 41 overlapping the UI object 51 to arrange the list 500. However, it is also possible to arrange the list 500 when a keyboard or the like is provided as the operation input unit 12 and a prescribed key input or the like is performed on the keyboard. In this case, the prescribed key input or the like is the operation for list display.

(Cancelation of List Display)

The UI editing unit 11 cancels display of the list 500 as follows.

Figure 6:
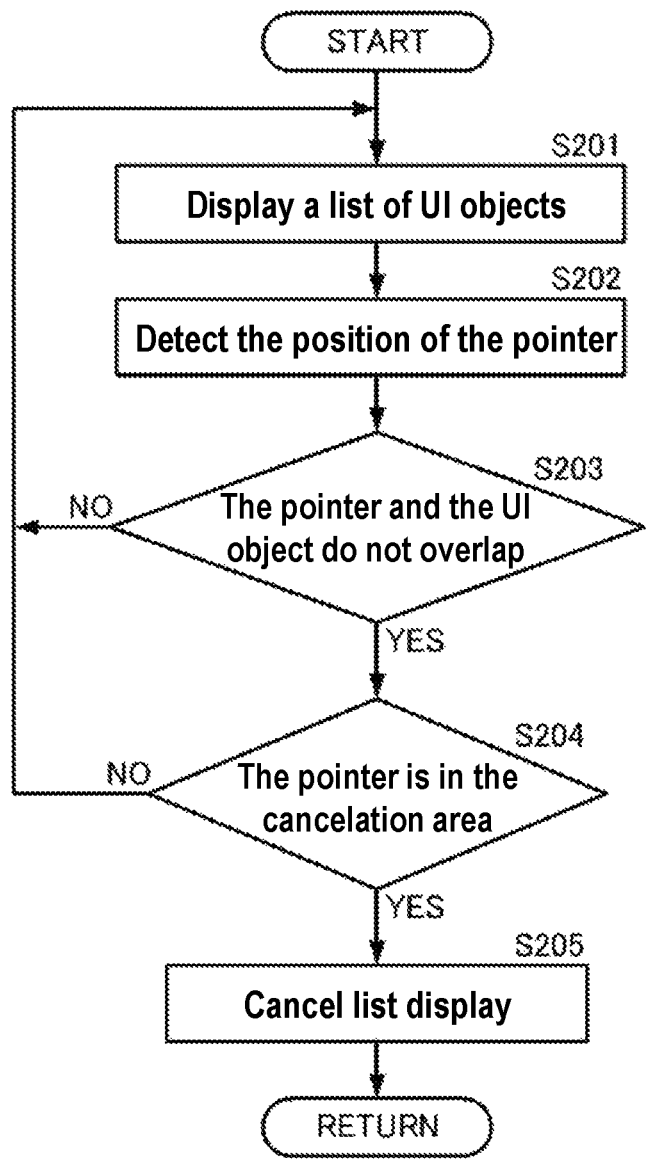
FIG. 6 is a flowchart showing a method of canceling list display of a plurality of UI objects.
Figure 7:
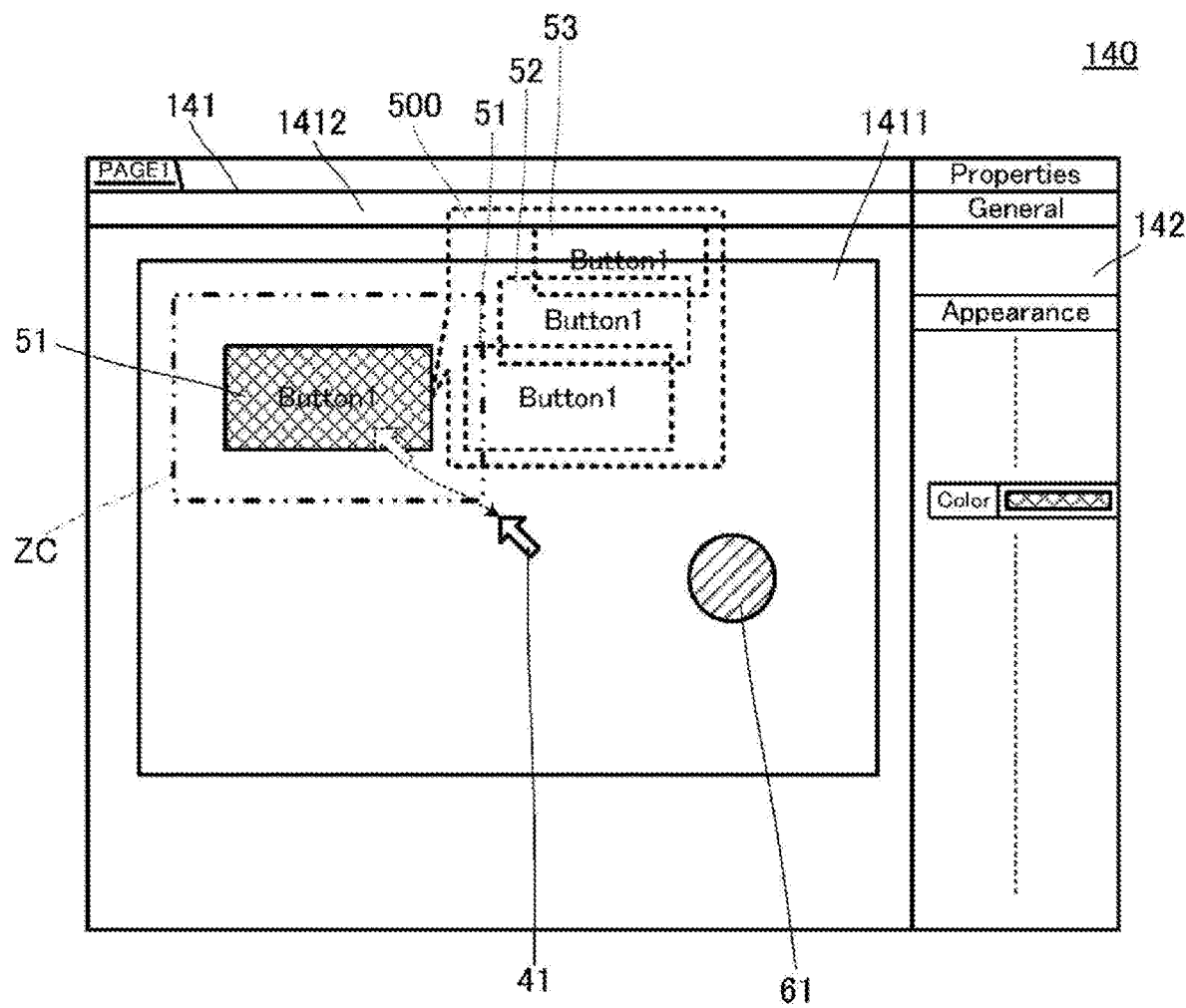
FIG. 7 is a diagram showing a state of the UI editing screen when the list display of a plurality of UI objects is canceled.

FIG. 6 is a flowchart showing a method of canceling list display of a plurality of UI objects. FIG. 7 is a diagram showing a state of the UI editing screen when the list display of a plurality of UI objects is canceled.

The UI editing unit 11 displays the list 500 of the UI objects in the above-described state (S201). In the meantime, the UI editing unit 11 detects the position of the pointer 41 (S202). The UI editing unit 11 detects whether the pointer 41 overlaps the UI object 51 (S203). This can be realized by the method of the flowchart shown in FIG. 3 described above.

If the pointer 41 and the UI object 51 overlap (S203: NO), the UI editing unit 11 continues to arrange the list 500 (S201).

If the pointer 41 and the UI object 51 do not overlap (S203: YES), the UI editing unit 11 detects whether the pointer 41 is in a cancelation area (S204).

The cancelation area is, for example, an area outside the area ZC which is widened by a prescribed distance from the area of the UI object 51 as shown in FIG. 7.

If the pointer 41 is not in the cancelation area (S204: NO), the UI editing unit 11 continues to arrange the list 500 (S201).

If the pointer 41 is in the cancelation area (S204: YES), the UI editing unit 11 deletes the list 500 from the UI editing screen 140 and cancels the list display (S205).

With such processing, the programmer can cancel the display of the list 500 and return to the normal editing of the UI editing screen 140 simply by moving the pointer 41.

In the above description, the display of the list 500 is canceled on condition that the pointer 41 enters the cancelation area. However, a delay time may also be set for cancelation of the display of the list 500. Specifically, the UI editing unit 11 detects that the pointer 41 enters the cancelation area, and cancels the display of the list 500 when the pointer 41 remains in the cancelation area for a time corresponding to the delay time.

(Change of UI Object to be Edited)

The UI editing unit 11 switches the UI object to be edited as follows.

Figure 8:
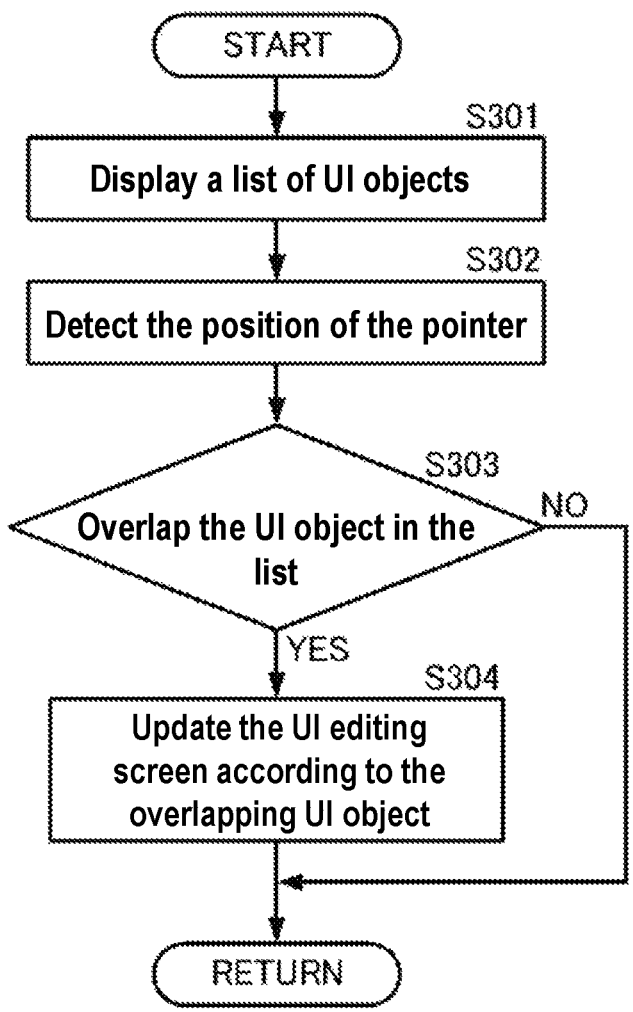
FIG. 8 is a flowchart showing a method of switching a UI object to be edited.
Figure 9:
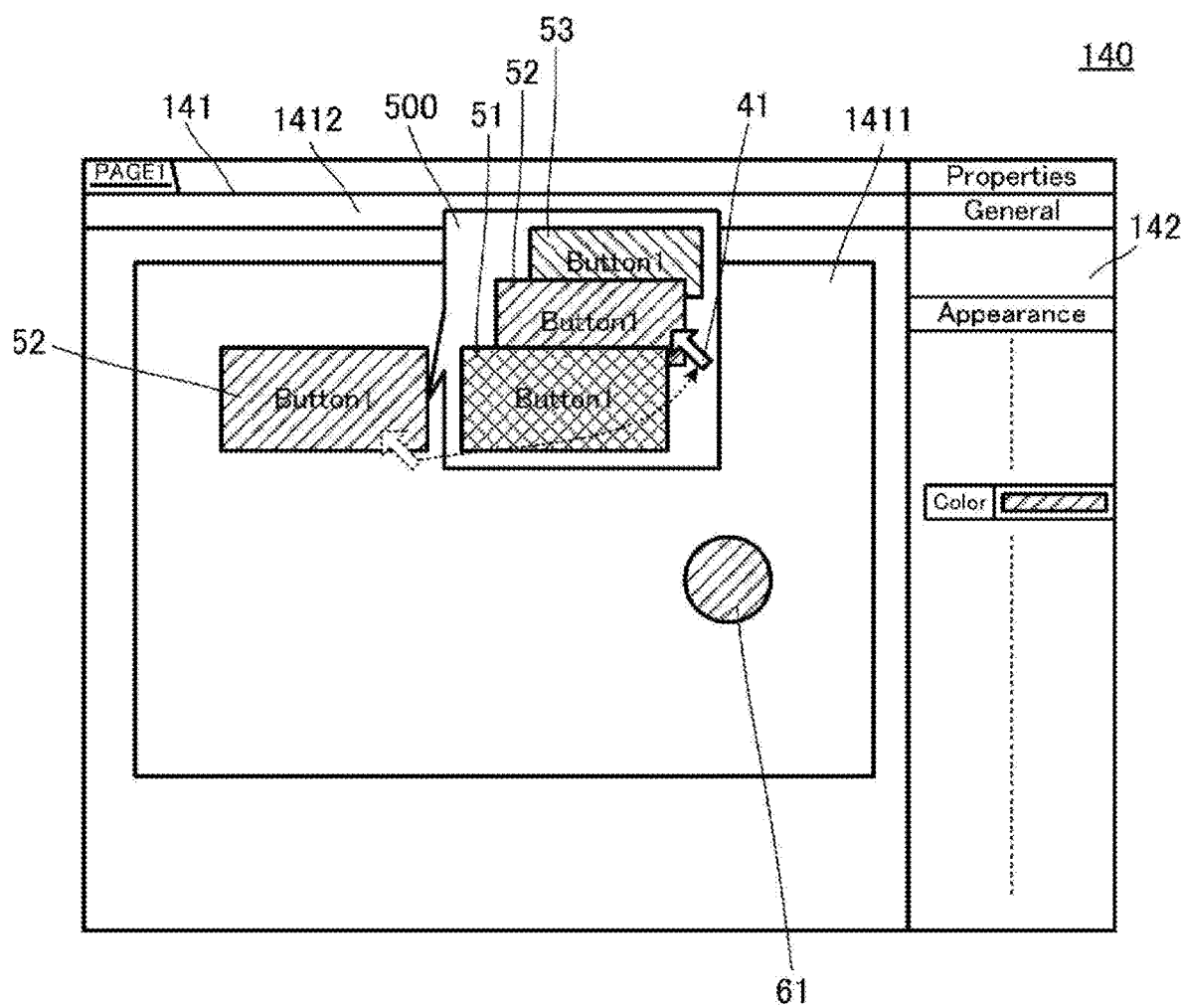
FIG. 9 is a diagram showing a state of the UI editing screen at the time of the process of switching the UI object to be edited.

FIG. 8 is a flowchart showing a method of switching the UI object to be edited. FIG. 9 is a diagram showing a state of the UI editing screen at the time of the process of switching the UI object to be edited.

The UI editing unit 11 displays the list 500 of the UI objects in the above-described state (S301). In the meantime, the UI editing unit 11 detects the position of the pointer 41 (S302).

The UI editing unit 11 detects whether the pointer 41 overlaps the UI object in the list 500 (S303). If the pointer 41 does not overlap the UI object in the list 500 (S303: NO), the UI editing unit 11 continues to display the list 500 of the UI objects.

If the pointer 41 overlaps the UI object in the list 500 (S303: YES), the UI editing unit 11 updates the UI editing screen 140 according to the UI object on which the pointer 41 overlaps (S304).

Specifically, the UI editing unit 11 switches the UI object on which the pointer 41 overlaps to the topmost UI object on the UI editing screen 140. Along with this, the display of the attribute display window 142 is also switched to the content corresponding to the topmost UI object after the switching. For example, in the example of FIG. 9, if the pointer 41 overlaps the UI object 52 in the list 500, the UI editing unit 11 switches the UI object 51 displayed on the topmost layer of the UI editing screen 140 to the UI object 52. Along with this, the UI editing unit 11 switches the display of the attribute display window 142 from the content corresponding to the UI object 51 to the content corresponding to the UI object 52. Then, the UI editing unit 11 enables editing of the UI object 52 in place of the UI object 51.

With such processing, the programmer can easily switch the UI object to be edited among a plurality of overlapping UI objects.

(Change of UI Object to be Edited)

The UI editing unit 11 unifies attributes of a plurality of overlapping UI objects as follows.

Figure 10:
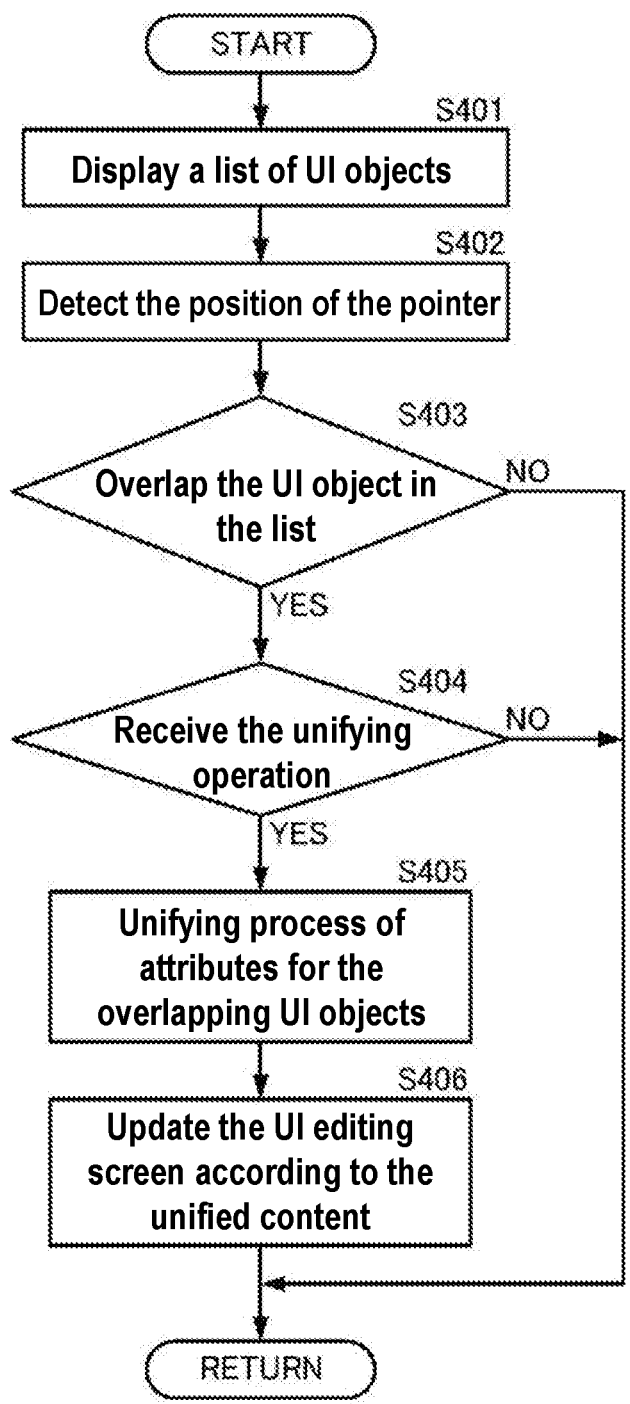
FIG. 10 is a flowchart showing a method of unifying attributes of a plurality of overlapping UI objects.
Figure 11:
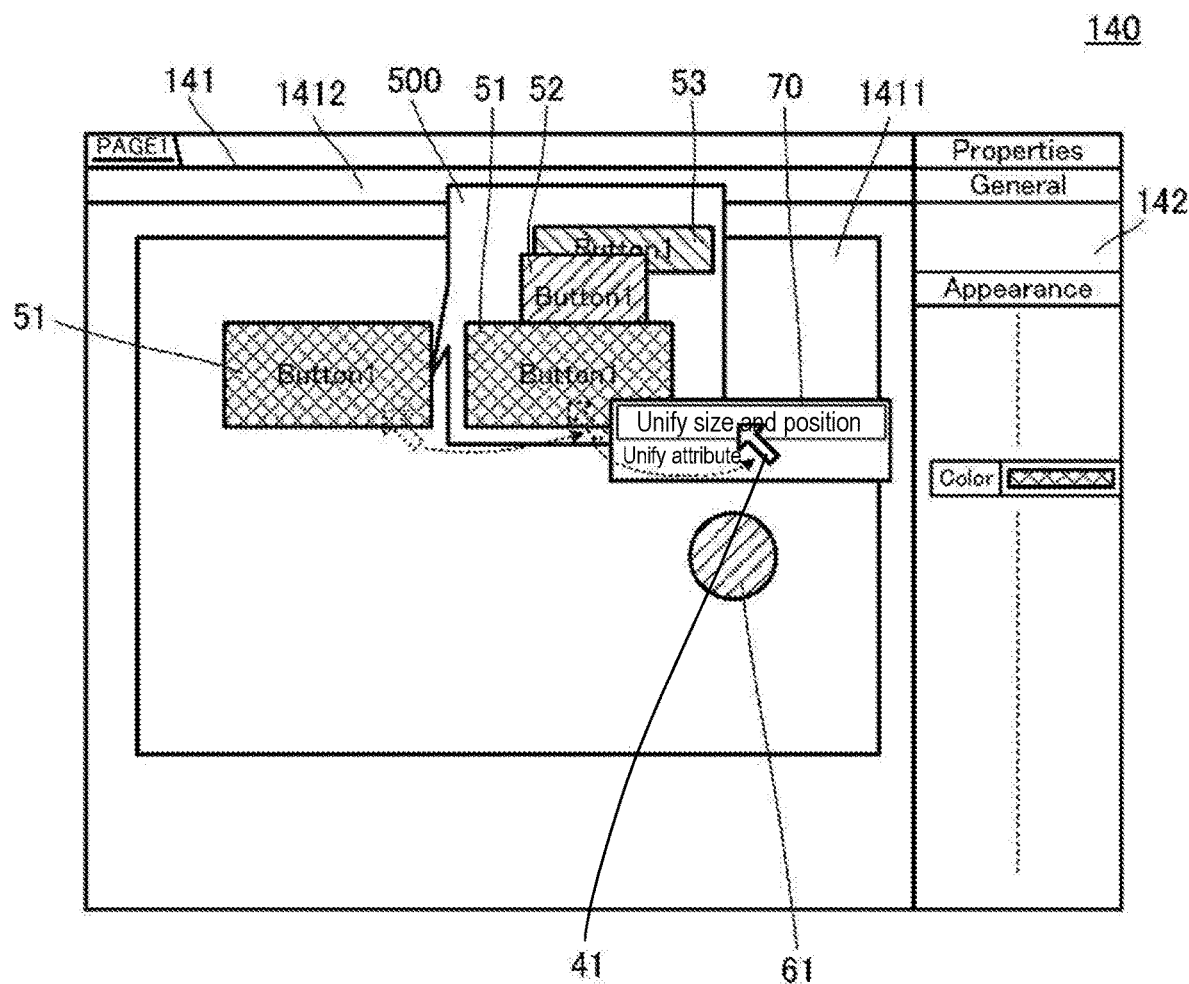
FIG. 11 is a diagram showing a state of the UI editing screen at the time of the process of unifying the attributes of a plurality of overlapping UI objects.

FIG. 10 is a flowchart showing a method of unifying attributes of a plurality of overlapping UI objects. FIG. 11 is a diagram showing a state of the UI editing screen at the time of the process of unifying the attributes of a plurality of overlapping UI objects.

The UI editing unit 11 displays the list 500 of the UI objects in the above-described state (S401). In the meantime, the UI editing unit 11 detects the position of the pointer 41 (S402).

The UI editing unit 11 detects whether the pointer 41 overlaps the UI object in the list 500 (S403). If the pointer 41 does not overlap the UI object in the list 500 (S403: NO), the UI editing unit 11 continues to display the list 500 of the UI objects.

If the pointer 41 overlaps the UI object in the list 500 (S403: YES), the UI editing unit 11 detects whether a unifying operation has been received from the operation input unit 12 (S404). If the unifying operation has not been received (S404: NO), the UI editing unit 11 continues to display the list 500 of the UI objects.

If the unifying operation is received (S404: YES), the UI editing unit 11 unifies the attributes of the plurality of UI objects included in the list 500, that is, the attributes of the plurality of UI objects overlapping on the UI editing screen 140, according to the operation content (S405). Then, the UI editing unit 11 updates the configuration of the UI editing screen 140 according to the unified content (S406).

For example, in the example of FIG. 11, the UI object 51, the UI object 52, and the UI object 53 included in the list 500 are different in size and center position.

When the pointer 41 overlaps the UI object 51 in the list 500, the UI editing unit 11 arranges a context menu 70, in which items to be unified are described, according to the unifying operation (for example, right click of the mouse which is the operation input unit 12). When an operation of selecting the item of unifying size and position in the context menu 70 is further received, the UI editing unit 11 unifies the sizes and positions of the plurality of UI objects 52 and 53 included in the list 500 together with the UI object 51 to the size and position of the UI object 51. Thereby, the sizes and center positions of the UI object 51, the UI object 52, and the UI object 53 are unified to the size and center position of the UI object 51.

In the example shown in FIG. 11, if unifying the attributes is selected, the UI editing unit 11 unifies changeable attributes of the UI object 51, the UI object 52, and the UI object 53.

In addition, according to the unifying process, the UI editing unit 11 changes not only the main window 141 but also the content of the attribute display window 142.

Thereby, the programmer can easily unify the attributes of a plurality of overlapping UI objects.

(Change of the Order of UI Objects)

The UI editing unit 11 changes the order of a plurality of overlapping UI objects as follows.

Figure 12:
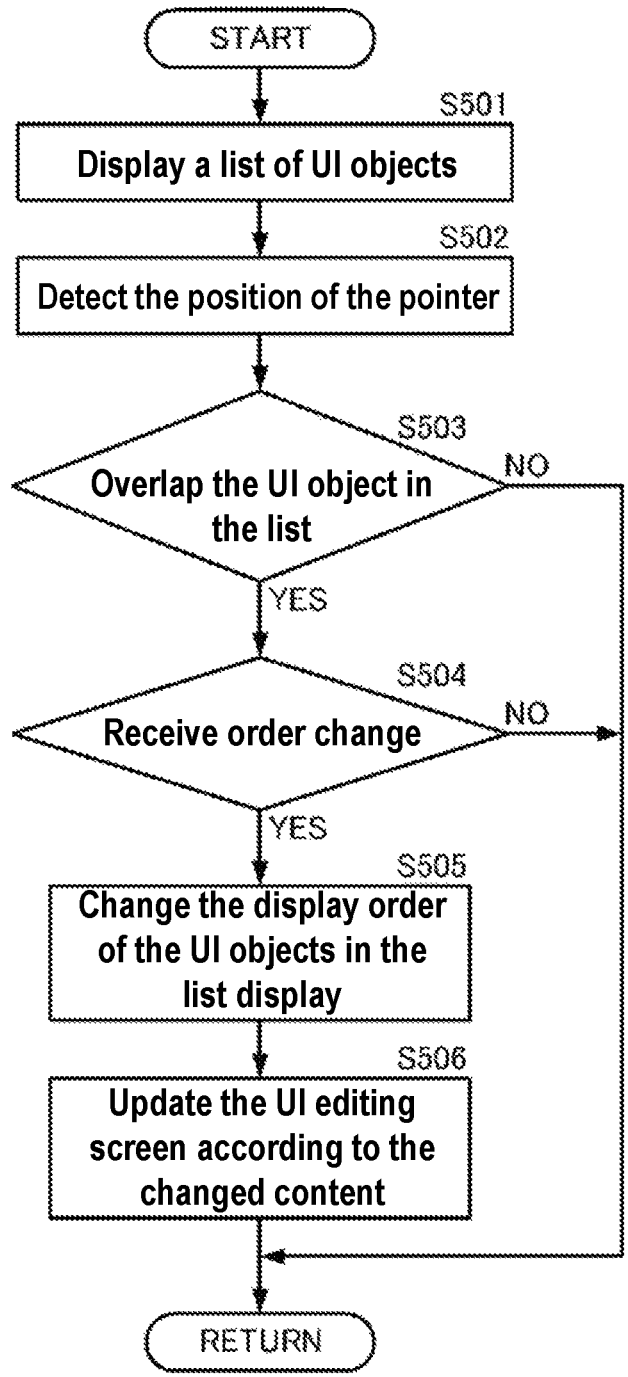
FIG. 12 is a flowchart showing a method of changing an order of a plurality of overlapping UI objects.
Figure 13:
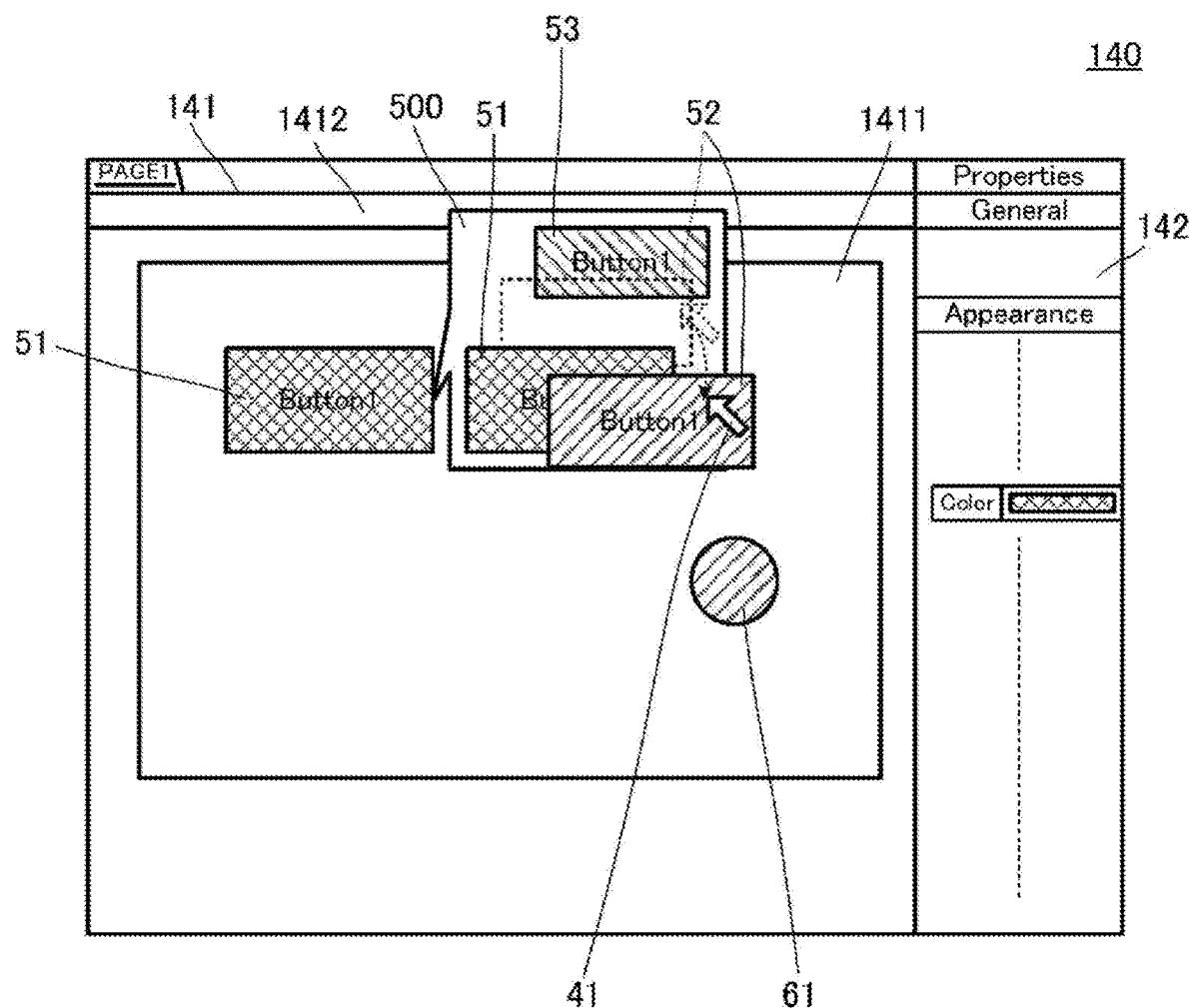
FIG. 13 is a diagram showing a state of the UI editing screen at the time of the process of changing the order of a plurality of overlapping UI objects.
Figure 14:
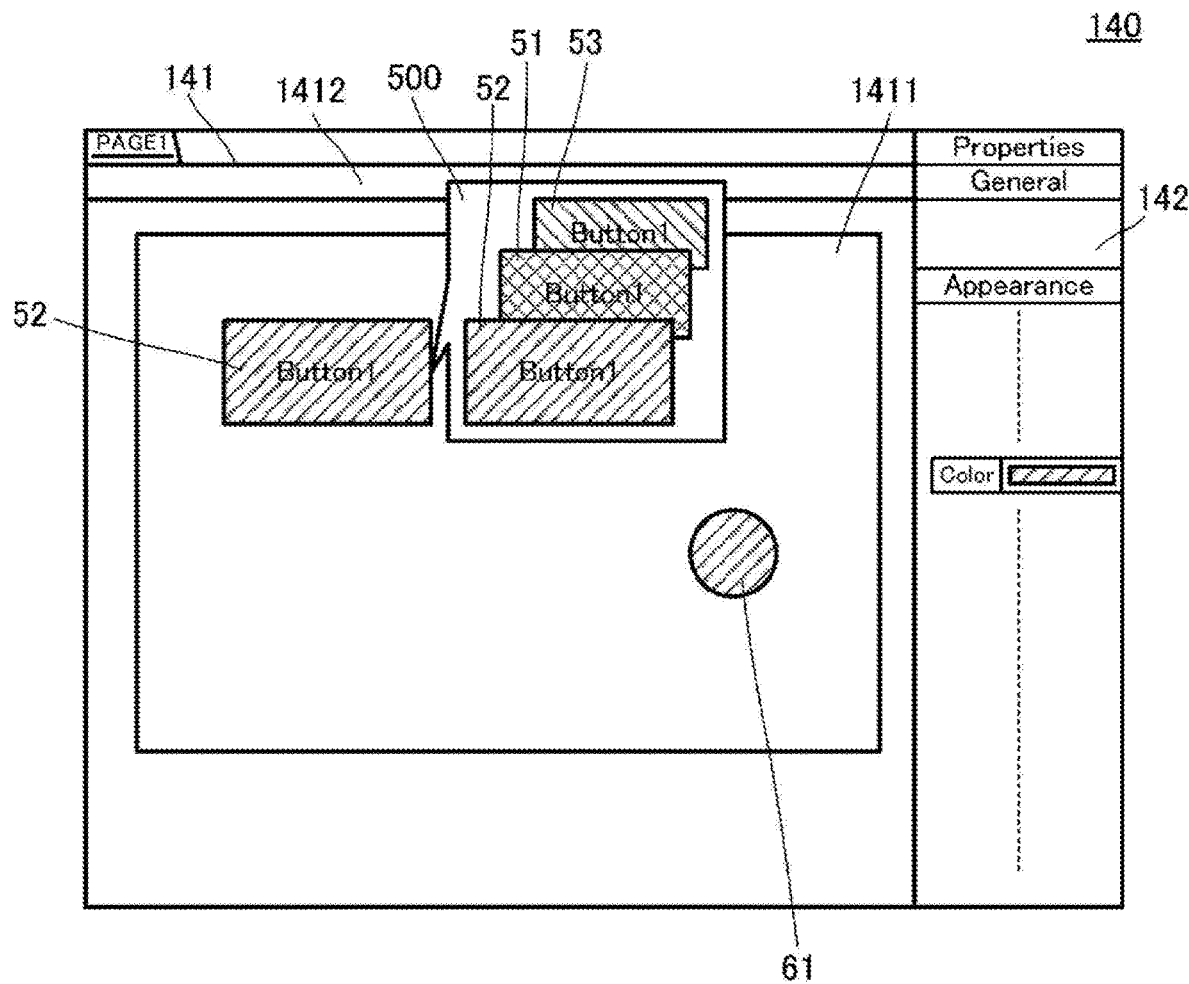
FIG. 14 is a diagram showing a state of the UI editing screen after the order of a plurality of overlapping UI objects is changed.

FIG. 12 is a flowchart showing a method of changing the order of a plurality of overlapping UI objects. FIG. 13 is a diagram showing a state of the UI editing screen at the time of the process of changing the order of a plurality of overlapping UI objects. FIG. 14 is a diagram showing a state of the UI editing screen after the order of the plurality of overlapping UI objects is changed.

The UI editing unit 11 displays the list 500 of the UI objects in the above-described state (S501). In the meantime, the UI editing unit 11 detects the position of the pointer 41 (S502).

The UI editing unit 11 detects whether the pointer 41 overlaps the UI object in the list 500 (S503). If the pointer 41 does not overlap the UI object in the list 500 (S503: NO), the UI editing unit 11 continues to display the list 500 of the UI objects.

If the pointer 41 overlaps the UI object in the list 500 (S503: YES), the UI editing unit 11 detects whether an operation of changing the order of the UI objects has been received from the operation input unit 12 (S504). If the order changing operation has not been received (S504: NO), the UI editing unit 11 continues to display the list 500 of the UI objects.

When the order changing operation is received (S504: YES), the UI editing unit 11 changes the display order of the plurality of UI objects included in the list 500, that is, the plurality of UI objects overlapping on the UI editing screen 140, according to the operation content (S505). Then, the UI editing unit 11 updates the configuration of the UI editing screen 140 according to the changed content (S506).

For example, in the example of FIG. 13, in the list 500, the UI object 51, the UI object 52, and the UI object 53 are arranged in this order.

When the pointer 41 overlaps the UI object 52 in the list 500, as shown in FIG. 13, the UI editing unit 11 receives an order changing operation of moving the UI object 52 to the top layer side of the UI object 51 (for example, drag and drop of the mouse which is the operation input unit 12). By receiving the order changing operation, as shown in FIG. 14, the UI editing unit 11 changes the order of the UI objects in the list 500 so that the UI object 52, the UI object 51, and the UI object 53 are arranged in this order from the top layer side. Furthermore, the UI editing unit 11 changes the configuration in the screen editing area 1411 from the configuration, in which the UI object 51 shown in FIG. 13 is arranged, to the configuration, in which the UI object 52 shown in FIG. 14 is arranged. At the same time, the UI editing unit 11 changes not only the main window 141 but also the content of the attribute display window 142 from the content of the UI object 51 to the content of the UI object 52.

Thereby, the programmer can easily change the order of a plurality of overlapping UI objects.

Although the above illustrates a mode that a plurality of overlapping UI objects are not grouped, the above processing can be applied even when a plurality of overlapping UI objects are grouped. That is, it is possible to perform list display, cancelation of list display, and change of the target to be edited in the same manner as the above-described processing when grouped UI objects at least partially overlap each other.

In addition, the UI objects are not limited to those that receive operation inputs, and also include those that are simply displayed.

Further, the plurality of processes described above may not be executed separately, and the plurality of processes described above may be executed in combination.

What is claimed is:

1. A user interface development assistance device, comprising:
    a processor executing an editing process of a user interface and displaying a generated editing screen on a display; and
    a mouse or a keyboard receiving an operation for editing of the user interface, wherein the mouse or the keyboard receives an operation of a pointer indicating a position in the editing screen,
    wherein when the position of the pointer is moved onto a topmost user interface object in which a plurality of user interface objects overlap on the editing screen, the processor enables the display to display a list of the plurality of user interface objects that overlap the topmost user interface object in the editing screen,
    after the list of the plurality of user interface objects is displayed in the edit screen, when the position of the pointer is moved onto a cancelation area that is larger than the topmost user interface object and is outside an area set to surround the topmost user interface object, the processor cancels the list display in the edit screen, and the list of the plurality of user interface objects is displayed when the pointer is inside the area set to surround the topmost user interface object, wherein the area set to surround the topmost user interface object is larger than an area of the topmost user interface object,
    wherein the editing screen comprises a main window and an attribute window, the main window displays the plurality of user interface objects, in response to receiving user interaction with the list of the plurality of user interface objects via the pointer to unify attributes of the plurality of user interface objects or change order of the plurality of user interface objects in the main window, attribute display of the plurality of user interface objects in the attribute window is automatically changed,
    wherein the plurality of user interface objects are different from the list of the plurality of user interface objects and attribute display in the attribute window includes name, type, variables, shape, color, size or position of at least one of the plurality of user interface objects.

2. The user interface development assistance device according to claim 1, wherein when an operation input of unifying names or colors for the plurality of user interface objects in the list is received from the mouse or the keyboard, the processor unifies the names or the colors of the plurality of user interface objects in the list to a name or a color of a selected user interface object in the list.

3. The user interface development assistance device according to claim 1, wherein when an operation input of selecting one of the plurality of user interface objects in the list is received from the mouse or the keyboard, the processor enables the display to display the selected user interface object as a topmost user interface object to be edited.

4. The user interface development assistance device according to claim 3, wherein when an operation input of unifying attributes for the plurality of user interface objects in the list is received from the mouse or the keyboard, the processor unifies the attributes of the plurality of user interface objects in the list.

5. The user interface development assistance device according to claim 1, wherein when an operation input of unifying attributes for the plurality of user interface objects in the list is received from the mouse or the keyboard, the processor unifies the attributes of the plurality of user interface objects in the list.

6. The user interface development assistance device according to claim 1, wherein when an operation input of changing a positional relationship between the plurality of user interface objects in the list is received from the mouse or the keyboard, the processor changes the positional relationship between the plurality of user interface objects in the list and sets a topmost user interface object of the plurality of user interface objects that overlap on the editing screen according to the change.

7. A user interface development assistance method, comprising:
    a user interface editing process of executing an editing process of a user interface and generating an editing screen by a processor;
    a display process enabled by the processor for displaying the editing screen on a display; and
    an operation input process of receiving an operation from a mouse or a keyboard for editing of the user interface, wherein the mouse or the keyboard receives an operation of a pointer indicating a position in the editing screen,
    wherein in the user interface editing process,
    when the position of the pointer is moved onto a topmost user interface object in which a plurality of user interface objects overlap on the editing screen, a list of the plurality of user interface objects that overlap the topmost user interface object is displayed in the editing screen,
    after the list of the plurality of user interface objects is displayed in the edit screen, when the position of the pointer is moved onto a cancelation area that is larger than the topmost user interface object and is outside an area set to surround the topmost user interface object, the processor cancels the list display in the edit screen, and the list of the plurality of user interface objects is displayed when the pointer is inside the area set to surround the topmost user interface object, wherein the area set to surround the topmost user interface object is larger than an area of the topmost user interface object,
    wherein the editing screen comprises a main window and an attribute window, the main window displays the plurality of user interface objects, in response to receiving user interaction with the list of the plurality of user interface objects via the pointer to unify attributes of the plurality of user interface objects or change order of the plurality of user interface objects in the main window, attribute display of the plurality of user interface objects in the attribute window is automatically changed, wherein the plurality of user interface objects are different from the list of the plurality of user interface objects and attribute display in the attribute window includes name, type, variables, shape, color, size or position of at least one of the plurality of user interface objects.

8. A non-transitory computer-readable recording medium comprising a user interface development assistance program, the user interface development assistance program enables a processor to execute:

a user interface editing process of executing an editing process of a user interface and generating an editing screen;

a display process of displaying the editing screen on a display; and an operation input process of receiving an operation from a mouse or a keyboard for editing of the user interface, wherein the mouse or the keyboard receives an operation of a pointer indicating a position in the editing screen, wherein in the user interface editing process, when the position of the pointer is moved onto a topmost user interface object in which a plurality of user interface objects overlap on the editing screen, the information processing device is enabled to execute a process of displaying a list of the plurality of user interface objects that overlap the topmost user interface object in the editing screen, after the list of the plurality of user interface objects is displayed in the edit screen, when the position of the pointer is moved onto a cancelation area that is larger than the topmost user interface object and is outside an area set to surround the topmost user interface object, the processor cancels the list display in the edit screen, and the list of the plurality of user interface objects is displayed when the pointer is inside the area set to surround the topmost user interface object, wherein the area set to surround the topmost user interface object is larger than an area of the topmost user interface object, wherein the editing screen comprises a main window and an attribute window, the main window displays the plurality of user interface objects, in response to receiving user interaction with the list of the plurality of user interface objects via the pointer to unify attributes of the plurality of user interface objects or change order of the plurality of user interface objects in the main window, attribute display of the plurality of user interface objects in the attribute window is automatically changed, wherein the plurality of user interface objects are different from the list of the plurality of user interface objects and attribute display in the attribute window includes name, type, variables, shape, color, size or position of at least one of the plurality of user interface objects.

\* \* \* \* \*